July 3, 1923.

A. R. LE MOON 1,460,594

FLEXIBLE COUPLING FOR DRIVE SHAFTS

Filed March 5, 1921

Witness:
Wm. C. Clark

Inventor
Axel R. LeMoon
Rummler & Rummler
Attys.

Patented July 3, 1923.

1,460,594

UNITED STATES PATENT OFFICE.

AXEL R. LE MOON, OF CHICAGO, ILLINOIS, ASSIGNOR TO NELSON & LE MOON, OF CHICAGO, ILLINOIS, A PARTNERSHIP.

FLEXIBLE COUPLING FOR DRIVE SHAFTS.

Application filed March 5, 1921. Serial No. 450,069.

*To all whom it may concern:*

Be it known that I, AXEL R. LE MOON, a citizen of the United States of America, and a resident of Chicago, county of Cook, and State of Illinois, have invented certain new and useful Improvements in Flexible Couplings for Drive Shafts, of which the following is a specification.

This invention relates to couplings or universal joints of the type which is required between sections of the drive shafts of motor vehicles to compensate for relative motion between the engine and the driven axles due to the spring mounting of the axles and some torsional motion which occurs in the vehicle frame. Such devices also serve to cushion the clutch action or the transmission of motion between the engine and driven wheels. The purpose of the present invention is to provide a housing for the flexible disks to prevent radial motion thereof and confine them to the action required for permitting a slight angular motion between the sections of the drive shaft. A further object of the invention is to provide a disk unit in which the separate disks are clamped together between beveled elliptical washers.

The objects of the invention are accomplished by the device shown in the accompanying drawings, in which—

Figure 1:
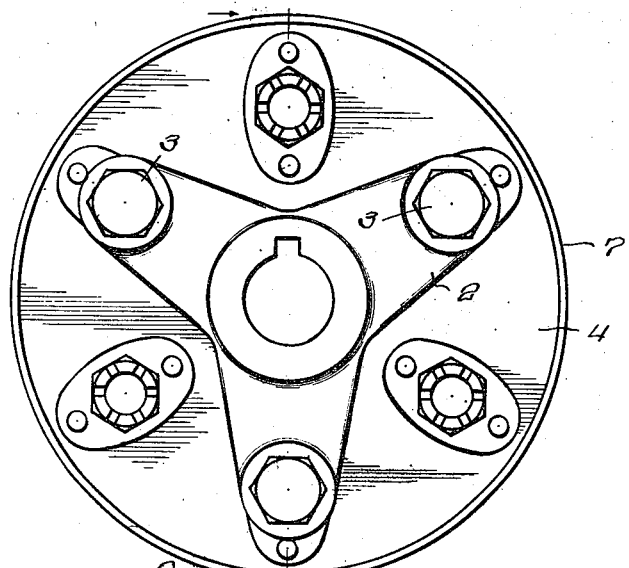
Fig. 1 is an end view of a coupling constructed according to this invention.
Figure 2:
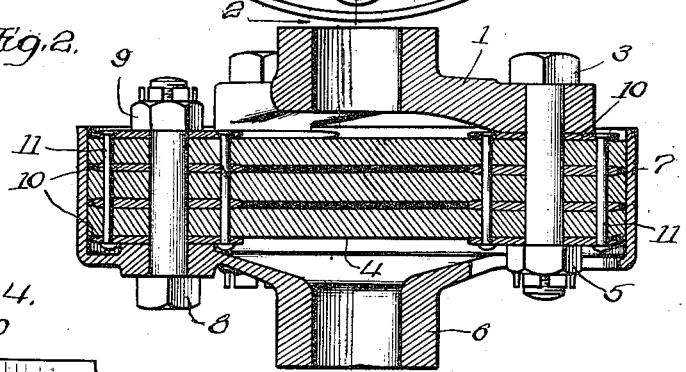
Fig. 2 is a sectional view taken on the line 2—2 of Fig. 1.
Figure 4:
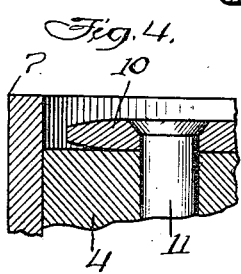
Fig. 4 is a sectional detail showing the form of one of the washers by means of which the flexible disks are clamped together.
Figure 3:
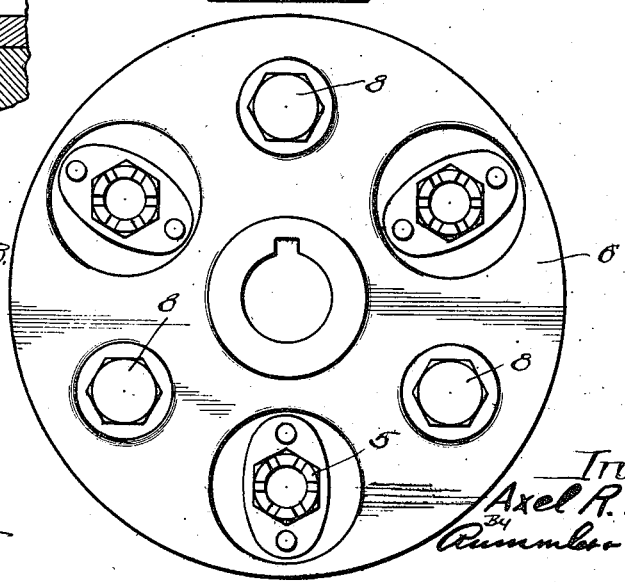
Fig. 3 is an end view opposite to the end view shown in Fig. 1.

The customary design of couplings of this class consists of a pair of spiders to which the shaft sections are respectively keyed and a plurality of flexible disks which are clamped between the spiders by bolts. Corrugated washers are frequently employed between the spiders and the disks to protect the disks and prevent their displacement. Such a construction is faulty due to wear developing in the disks at the point of the bolts, resulting in time in a whipping action between the shaft sections which when it occurs soon renders the structure liable to breakage. The corrugated washers also have a tendency to cut into the disks.

With the present arrangement the disks are secured together as a unit by rivets which pass through a plurality of clamping washers located on each face of the set of disks and between the same. These washers are elliptical in form, having holes near their ends for receiving the rivets and central apertures by which the disk unit is respectively secured to a spider on one shaft section and a drum on a coaxial shaft section. This drum surrounds the disk unit and prevents radial movement between the disks and thus confines the coupling to an action permitting angular motion only between the shaft sections. In this manner the joint is rendered safer and the shafts are centered and maintained in strictly coaxial relation.

In the drawings, the spider 1, to which one of the shaft sections is keyed, is shown provided with three arms 2 which are apertured at their ends to receive the bolts 3. These bolts pass through the disk unit 4 which is clamped to the spider 1 by means of the nuts 5. The remaining shaft section is keyed to a drum 6, the cylindrical flange 7 of which encircles the disk unit 4. The drum 6 is clamped to the disk unit by means of the bolts and nuts 8 and 9. Each disk unit 4 comprises a plurality of rubber canvas disks which are clamped together by the washers 10 and rivets 11. The washers are provided with beveled edges so as to not cut into the disks and are elliptical in form so as to receive a rivet at each end and provide a central aperture through which the bolts 3 and 8 pass, said washers being positioned with their long axes disposed radially. With this arrangement flexing of the washer unit may take place between the location of the bolts in order to allow for relative angular motion between the shaft sections but radial motion between the disks is prevented not only by the clamping means for the disk unit but by the cylindrical flange 7 of the housing member 6. Accordingly, wear of the disks at the location of the bolts is prevented and the whipping action between the shafts, which it is particularly desired to avoid, can not take place, the shafts being maintained in proper centered position in the coupling.

The elongated form and radial position of the washers gives a maximum of support and distribution of bearing for the bolts 9 consistent with the desired flexibility of the component disks of unit 4.

Although but one specific embodiment of this invention has been herein shown and described, it will be understood that numerous details of the construction shown may be altered or omitted without departing from the spirit of this invention as defined by the following claims.

I claim:

1. A flexible coupling comprising in combination two shaft receiving members and a laminated disk to which said members are secured at alternate points respectively spaced apart adjacent to the periphery of said disk, said disk including beveled edge radially positioned oblong washers secured adjacent to their ends to the adjacent laminations which are all flexible, and clamping means extending through said disk and through the washers whereby said members are respectively secured to said disk in flexible relation to each other.

2. In a coupling a unit comprising, in combination, a plurality of flexible disks, a peripheral series of washers disposed between said disks, and rivets whereby said disks and washers are unified, said washers having bevelled edges and said disks being spaced apart appreciably and provided with perforations in registry with the holes in said washers.

Signed at Chicago this 1st day of March, 1921.

AXEL R. LE MOON.